Feb. 16, 1954     H. G. FITZ GERALD     2,669,156
IMAGE SLIDE PROJECTOR APPARATUS
Filed April 22, 1950
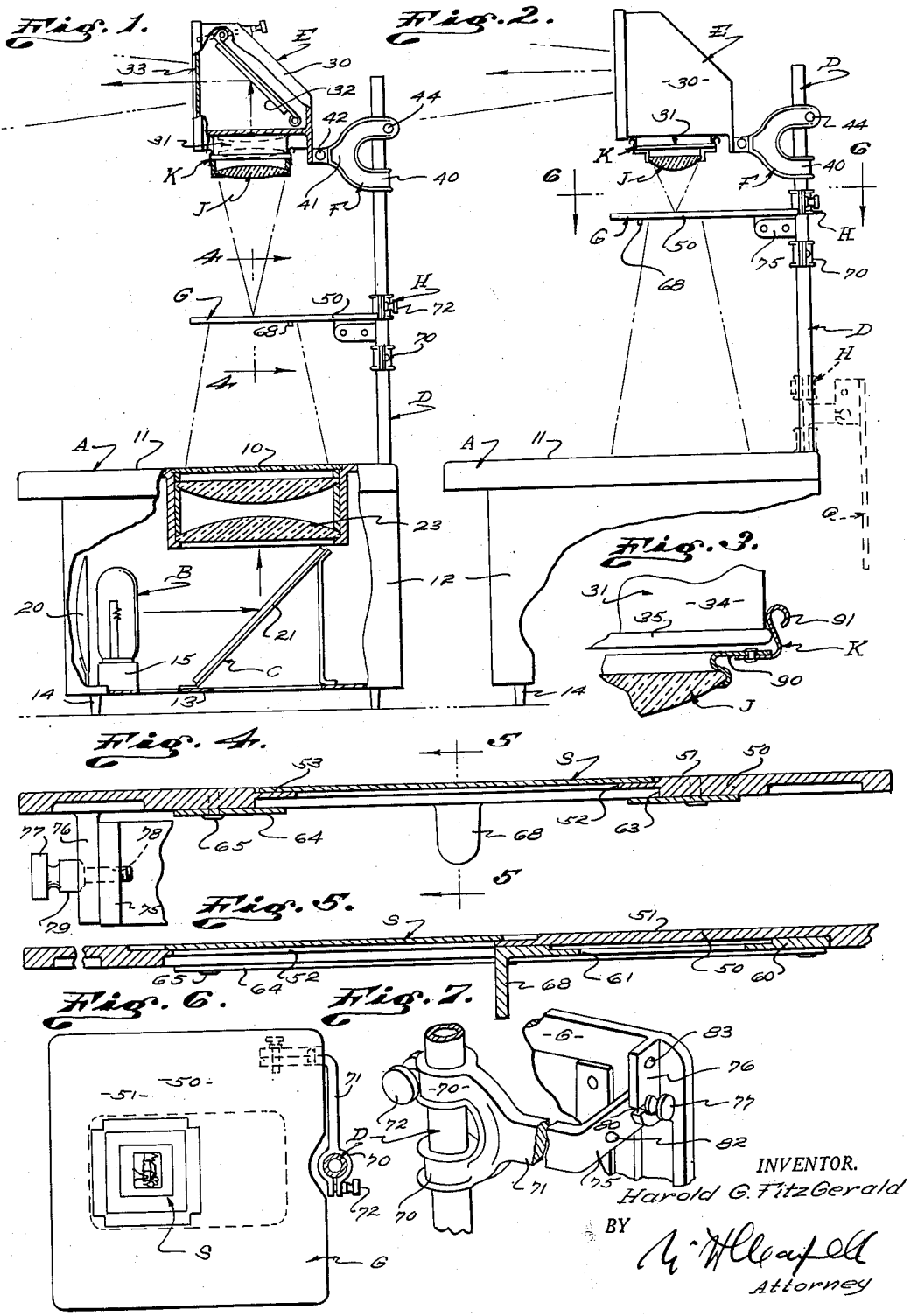
INVENTOR.
Harold G. FitzGerald
BY
Attorney Patented Feb. 16, 1954

2,669,156

UNITED STATES PATENT OFFICE 2,669,156

IMAGE SLIDE PROJECTOR APPARATUS

Harold G. Fitz Gerald, Los Angeles, Calif.

Application April 22, 1950, Serial No. 157,511

5 Claims. (Cl. 88—26)

This invention has to do with a slide projector, it being a general object of the invention to provide a simple, practical, improved device for projecting images from slides, or the like.

Projecting devices are in general or common use serving to project light through transparencies so that an image is cast upon a screen, or the like. The general type of structure referred to is that having a body carrying a light source and having a top with a transparent section designed to receive or carry a transparency or a sheet on which markings are provided or applied in such manner as to be projected onto a screen by means of a projection head carried on a post. The general class of device referred to is suitable for handling plates, slides, or transparencies which are of substantial size, but it is impractical or unsuited for the handling of transparencies of limited size. It is a general object of this invention to provide apparatus of the general type hereinabove referred to including elements for carrying small slides or slides of limited size and to provide for effective projection of images from such slides or transparencies.

A further object of this invention is to provide apparatus of the general character referred to applicable to a typical or standard type of projector as an attachment to make such apparatus effective for the projection of slides considerably smaller than those normally handled by the apparatus.

A further object of the invention is to provide structure of the general character referred to involving few simple parts that are inexpensive of manufacture and which are simple and convenient to handle or manipulate.

The structure to which the present invention is applicable or in which the invention is incorporated includes, generally, a box-like body, the top of which has a transparent section. A light source in the body delivers light to a means which directs the light upwardly through the transparent section of the body. A post or standard projects upwardly from the body and carries a light projecting head in vertical alignment with the transparent section of the body top. The projecting head involves a projection lens and a reflector which act to direct the light received from the body horizontally in such manner as to fall on a screen, or the like, and thus cast an image of a transparency that may be interposed between the body and the projection head. A slide or transparency carrier is supported by the post to occur between the projection head and the body and involves, generally, a plate with a light-passing aperture, an apertured shutter slidably carried by the plate to modify the size or shape of both of the openings through the carrier, and mounting means supporting the plate from the post. The shutter is supported so that it can be shifted into and out of position to register with the aperture in the plate and the mounting means supports the plate so that it can be shifted between a horizontal position where it is in the path of light between the body and projection head and a position where it is vertically disposed and removed from the light passing from the body to the projection head. The mounting means is preferably such that the plate can be completely detached or separated and hence removed, as circumstances may require. The structure further involves a lens interposed between the lens of the projection head and the slide carrier serving to modify or vary the effective focal length of the projection lens.

The various objects and features of my invention will be fully understood from the following detailed description of a typical preferred form and application of the invention, throughout which description reference is made to the accompanying drawings, in which:

Fig. 1 is a side elevation of apparatus embodying the present invention showing a slide carrier in operating position and cooperating with a modifying lens to effectively project an image from a slide considerably smaller than is intended to be handled by the body of the structure, parts of the construction being broken away to show details of the construction. Fig. 2 is a view similar to Fig. 1 showing the construction set to handle slides smaller than those to be handled with the setting shown in Fig. 1, and showing a modifying lens of a type or size suitable for the setting illustrated, the slide carrier being shown in dotted lines and in an inoperative position. Fig. 3 is an enlarged side elevation of a portion of the structure shown in Fig. 2 showing the manner in which the modifying projection lens is releasably retained in operating position. Fig. 4 is an enlarged detailed sectional view taken as indicated by line 4—4 on Fig. 1. Fig. 5 is a detailed sectional view taken as indicated by line 5—5 on Fig. 4. Fig. 6 is an enlarged plan section taken as indicated by line 6—6 on Fig. 2, and Fig. 7 is a positive view of the mounting means provided for the slide carrier showing the parts positioned as indicated in dotted lines in Fig. 2.

The structure illustrated in the drawings involves, generally, a box-like body A, a light source B within the body, means C receiving light from the source B and directing it upwardly through a transparent section 10 in the top 11 of the body, a post D projecting upwardly from the body, a light projecting head E carried by the post D through a mounting means F so that it occurs above the transparent section 10, a slide carrier G, mounting means H supporting the carrier G from the post D to be movable into and out of position in the path of light passing from the section 10 to the head E, a modifying lens J and a mounting means K for lens J.

The body A is shown as a simple, box-like structure characterized by vertical walls 12 carrying the top 11 and provided with a bottom 13. In the particular case illustrated the body is shown provided with suitable legs 14 which serve to support it with the bottom 13 a suitable distance above a suitable support such as a table top or the like.

The light source B is suitably located in the body A and may, as shown, be a suitable incandescent lamp carried in a socket 15 suitably located in the body.

The means C directing light from the lamp B through the transparent section 10 of top 11 is shown as including a concentrating light reflector 20 located behind the lamp and directing light horizontally in the body onto an angularly related flat reflector 21 which directs the light upwardly toward the transparent section 10 and through a suitable lens assembly 23 supported in the body beneath the transparent section 10. The means C best shown in Fig. 1 of the drawings serves to direct a shaft of light upwardly through the transparent section 10 and toward the projection head E so that it will shine through a transparency located between the body and the head.

The post D is shown as a rigid vertically disposed element carried by the body A adjacent one edge thereof so that it is laterally offset from the transparent section 10 of top 11.

The light projecting head E is of typical form and construction and is shown as involving, generally, a housing 30 at the bottom of which there is a projection lens assembly 31 receiving light projected up through section 10. An inclined or angularly disposed flat reflector 32 arranged in the housing receives light from the lens assembly 31 and directs it horizontally through one side of the housing 30 where the housing has an opening covered by a suitable transparency 33. The particular lens unit or assembly 31 is shown as involving a tubular lens holder 34 depending from the housing 30 and having an annular flange-like enlargement 35 at its lower end.

The mounting F serves to support the projecting head E from the post D and is shown as involving collars 40 slidably carried on the post D and supporting a projecting arm 41 to which the housing E is secured by a suitable clamp fastener 42. One of the collars 40 may be split and provided with a screw clamp 44 so that the mounting F can be adjusted vertically along the post to vary the position of the head above the body A.

The structure thus far described in detail is a standard or typical type of projector and the lens assembly 31 of the projection head E is such that a transparency arranged on the top of the body A to overlie the transparent section 10 will have images or markings thereon projected by means of the head.

In accordance with the present invention the carrier G is provided to effectively support slides or transparencies considerably smaller than those intended to cover the transparent section 10 of the body A and the structure is such as to accommodate small slides of different sizes. In Fig. 1 a setting of the structure is shown to carry or accommodate slides of one size and in Fig. 2 the setting is such as to accommodate slides of a still smaller size.

The carrier G provided by the present invention preferably involves a plate 50 with a flat top 51 and a light passing opening or aperture 52. The plate is adapted to be mounted by means H so that it is horizontally disposed and has its aperture or opening 52 in line with or in registration with the section 10 and lens assembly 31, as shown throughout the drawings. The aperture 52 in plate 50 is such as to properly accommodate or pass light to a transparent slide S considerably smaller than a slide that would cover the transparent section 10 of the body. In the form of the invention illustrated the aperture 52 in the plate 50 is rectangular in plan configuration, in which case it will advantageously accommodate a rectangular slide and slide receiving recesses 53 are provided in the top of the plate adjacent the edges of the opening or aperture 52 to receive the marginal or edge portions of the slide S in the manner shown in Fig. 4 of the drawings. Through this construction a slide can be accurately positioned in register with the aperture 52.

In a typical application of the present invention the aperture 52 in the plate 50 is such as to accommodate a slide S of such size that the desired projection is gained with a suitable modifying lens J when the plate 50 is positioned about as shown in Fig. 1 of the drawings. When it is desired to project a slide which is substantially smaller than the slide S shown in Fig. 4, an apertured shutter 60 is employed. In the preferred form of the invention the shutter 60 is a flat plate-like element slidably carried by the plate 50, preferably at the bottom thereof, and the shutter has an aperture 61 considerably smaller in size than the aperture 52. In the form of the invention illustrated guideways 63 are provided at or in the bottom of plate 50 and the shutter 60 is slidably suported in the guideways 63, being retained therein by flange members 64 secured in position by suitable fasteners 65. The plate 50 and shutter 60 are so proportioned that when the shuttter is in a retracted position, as shown in Fig. 5, it leaves the aperture 52 in the plate 50 wholly unrestricted. When the shutter 60 is moved to operating position it covers the aperture 52 and the aperture 61 in the shutter can be positioned concentric with the aperture 52. The shutter 60 is provided with slide guiding recesses 67 adjacent the edges of aperture 61 and a suitable handle 68 is provided to depend from the shutter so that it can be conveniently operated between the positions above described.

The mounting means H supporting the plate 50 from the post D is shown as involving a mounting bracket made up of spaced collars 70 and an arm 71 projecting from the collars. The collars are slidable on the post D and one of them is preferably split and carries a clamp screw 72 that can be operated to set it against movement on the post when the plate 50 has been arranged in the desired manner.

The arm 71, which is rigid with the collars 70, as shown in Fig. 7, projects radially from the post and a flat lug 75 projects laterally from the outer end of the arm. A depending flange 76 is provided on the bottom of the plate adjacent one edge and preferably at one corner of the plate. The flange 76 is adapted to be arranged against the lug 75 and a screw fastener 77 is provided for connecting the flange and lug. In the particular case illustrated the fastener 77 is threaded into an opening 78 provided in the lug 75 and has a head 79 that engages the flange 76 to clamp the flange against the lug. A notch 80 in the flange 76 receives the screw fastener as shown in Fig. 7 of the drawings and permits of the flange being completely detached from the lug 75 whenever the fastener 77 is released and as circumstances may require. A suitable lock or stop means is provided for setting the plate 50 in a horizontal position. In the case illustrated a projection or pin 82 projects from the lug 75 and enters a socket opening 83 in the flange 76 when the flange and lug are related so that the plate 50 is horizontal. Through the mounting H above described the plate 50 can be readily positioned in operating positions such as are shown in Figs. 1 and 2 of the drawings and when the plate is not required for use it can be completely detached following release of the clamp screw 77, or the bracket can be swung to a position such as is shown in the dotted position in Fig. 2 and the plate can be positioned vertically as there shown, all with the result that the plate is out of the path of light and is so located that it does not in any way interfere with normal use of the apparatus.

When the plate 50, or the plate 50 and the shutter 60 carried thereby, are located to properly position slides of different sizes, as indicated in Figs. 1 and 2 of the drawings, modifying projection lenses J are employed. When the plate 50 is positioned to utilize the aperture 52 therein and is located about as shown in Fig. 1, a modifying lens J is used having a focal length which is such as to modify the action of the projection lens assembly 31 of head E so that a slide on the plate 50 and in register with the aperture 52 is properly projected. When the shutter 60 is employed and the parts are positioned as shown in Fig. 2 a projection lens J is used having a different focal length and serving to modify the lens assembly of the head E so that the desired projection is gained. It will be understood that various and suitable lenses J can be provided. The means K provided by the present invention serves to releasably mount a lens J so that it supplements the lens unit 31 of the projection head. In the case illustrated the modifying lens J is mounted in a holder 90 and the holder is provided at its periphery with spring clips 91 that can be releasably engaged over the flange 35 in the manner clearly illustrated in Fig. 3 of the drawings. Through the construction just described modifying lenses J can be arranged in place and removed at will, making it simple and convenient to modify the action of the projection head to accommodate the slides being projected.

From the foregoing description it will be apparent that as the apparatus operates the shaft of light delivered by the means C converges upwardly from the body to the head E. When large slides are to be projected they may be arranged directly on the top of the body A in register with the transparent section 10. When small slides are to be used the carrier G is employed and it may be positioned as indicated in Figs. 1 and 2 according to the size of the slide and so that a maximum amount of light is projected through the slide. As above described it will be understood how modifying lenses J can be applied to the projection head to vary its action, depending upon the location of the slide relative to the head. With the structure provided by the present invention the various adjustments or adaptations can be made easily and quickly, so that the apparatus can be converted to handle slides of various sizes with little or no waste of time.

Having described only a typical preferred form and application of my invention, I do not wish to be limited or restricted to the specific details herein set forth, but wish to reserve to myself any variations or modifications that may appear to those skilled in the art and fall within the scope of the following claims:

Having described my invention, I claim:

1. An image projector including, a box-like body having a top with a transparent section therein, a light source in the body, a post projecting up from the body, means in the body directing light from the light source in a vertical shaft up through said section, a light projecting head on the post above said section receiving said vertical shaft of light and delivering a shaft of light horizontally and including a lens normally projecting an image from a transparency on the top of the body, a slide carrier on the post carrying a slide above said section and in the path of said vertical shaft of light, and a lens attached to the head and cooperating with the lens of the projecting head to project an image from the slide, the carrier including a plate in a plane normal to the axis of said vertical shaft of light and having an aperture passing light to the head and an apertured shutter slidably carried by the plate and adapted to be shifted relative to the plate to move the aperture in the shutter into and out of register with the aperture of the plate the aperture in the shutter being smaller than the aperture in the plate.

2. An image projector including, a box-like body having a top with a transparent section therein, a light source in the body, a post projecting up from the body, means in the body directing light from the light source in a vertical shaft up through said section, a light projecting head on the post above said section receiving said vertical shaft of light and delivering a shaft of light horizontally and including a lens normally projecting an image from a transparency on the top of the body, a slide carrier on the post carrying a slide above said section and in the path of said vertical shaft of light, and a lens attached to the head and cooperating with the lens of the projecting head to project an image from the slide, the carrier including a plate in a plane normal to the axis of said shaft, the plate having an aperture passing light to the head and having a slide receiving recess in the upper side thereof and at the aperture, and an apertured shutter slidably carried by the plate at the lower side thereof and movable into and out of position where it fully occupies the aperture of the plate, the aperture in the shutter being substantially smaller than the aperture in the plate.

3. An image projector including, a box-like body having a top with a transparent section therein, a light source in the body, a post projecting up from the body, means in the body directing light from the light source in a vertical shaft up through said section, a light projecting head on the post above said section receiving said vertical shaft of light and delivering a shaft of light horizontally and including a lens normally projecting an image from a transparency on the top of the body, an apertured slide carrying plate, mounting means supporting the plate from the post between the head and body and with the aperture of the plate passing light to the head, and a lens at the head and cooperating with the lens of the projecting head to project an image from the slide, the mounting means including a bracket slidable on the post and having an arm projecting radially of the post, a lug on the arm projecting laterally of the arm, a flange on the plate, and a screw fastener connecting the lug and flange.

4. An image projector including, a box-like body having a top with a transparent section therein, a light source in the body, a post projecting up from the body, means in the body directing light from the light source in a vertical shaft up through said section, a light projecting head on the post above said section receiving said vertical shaft of light and delivering a shaft of light horizontally and including a lens normally projecting an image from a transparency on the top of the body, an apertured slide carrying plate, mounting means supporting the plate from the post between the head and body and with the aperture of the plate passing light to the head, and a lens at the head and cooperating with the lens of the projecting head to project an image from the slide, the mounting means including a bracket slidable on the post, a clamp screw setting the bracket against movement on the post, the bracket having an arm projecting radially of the post and having a laterally projecting lug on the arm, a flange on the plate, a screw fastener connecting the lug and flange, and stop means stopping the plate in a horizontal plane.

5. An image projector including, a box-like body having a substantially horizontal top with a transparent section therein adapted to support a transparency, a light source in the body directing light horizontally in the body, a substantially vertical post projecting up from the top of the body, means in the body receiving light from the light source and directing it upwardly in a vertical shaft that passes up through said section, a unitary light projecting head on the post and spaced a substantial distance above said section and including a reflector receiving said vertical shaft and light and delivering a shaft of light horizontally and including a lens permanently related to the reflector and normally projecting an image from a transparency on the top of the body, a slide carrier on the post between the head and body and adapted to carry a slide between the head and said section and in the path of said vertical shaft of light, a second lens and means adapted to releasably support said second lens adjacent the head whereby said second lens cooperates with the lens of the projecting head to project an image from the slide.

HAROLD G. FITZ GERALD.

References Cited in the file of this patent
UNITED STATES PATENTS

| Number | Name | Date |
|---|---|---|
| 778,891 | Rausch | Jan. 3, 1905 |
| 1,038,349 | Goodrich | Sept. 10, 1912 |
| 1,174,208 | Walsh | Mar. 7, 1916 |
| 1,176,485 | Ott | Mar. 21, 1916 |
| 1,204,425 | Gall | Nov. 14, 1916 |
| 1,738,942 | Brenkert et al. | Dec. 10, 1929 |
| 1,857,135 | Brenkert et al. | May 10, 1932 |
| 2,124,954 | Pirmov | July 26, 1938 |
| 2,158,903 | Knobel | May 16, 1939 |
| 2,221,160 | Worthington et al. | Nov. 12, 1940 |
| 2,243,084 | Browne | May 27, 1941 |
| 2,250,174 | Bancroft | July 22, 1941 |
| 2,285,915 | Dutton | June 9, 1942 |
| 2,330,799 | Coker et al. | Oct. 5, 1943 |
| 2,564,057 | Fitzgerald | Aug. 14, 1951 |